United States Patent [19]

Liang et al.

[11] Patent Number: 5,010,114

[45] Date of Patent: Apr. 23, 1991

[54] MICROSUSPENSION POLYMERIZATION

[75] Inventors: Rong-Chang Liang, Centerville; Emerson K. Colyer, Kettering; Jing-Den Chen, Spring Valley; Karl A. Kintz, Kettering; Chih-Her Suen, Spring Valley, all of Ohio

[73] Assignee: The Mead Corporation, Dayton, Ohio

[21] Appl. No.: 465,299

[22] Filed: Jan. 16, 1990

[51] Int. Cl.$^5$ .............................. C08G 18/14
[52] U.S. Cl. ...................... 521/109.1; 521/128; 521/130; 521/137; 521/155; 524/732; 524/773; 524/839; 524/840
[58] Field of Search ............ 521/109.1, 128, 130, 521/137, 155; 524/732, 773, 839, 840

[56] References Cited

U.S. PATENT DOCUMENTS 4,353,809  10/1939  Hoshi et al. ............... 252/316
4,877,767  10/1982  Liang et al. ............... 503/212

*Primary Examiner*—Maurice J. Welsh
*Attorney, Agent, or Firm*—Thompson, Hine and Flory

[57] ABSTRACT

Method for polymerizing a monomer suspended in water which comprises:

Preparing a polymerization mixture of a water immiscible, liquid, ethylenically unsaturated monomer, a polyisocyanate and an oil soluble free radical initiator, dispersing said mixture in a solution of water and a surfactant, and effecting polymerization of said monomer.

17 Claims, No Drawings

MICROSUSPENSION POLYMERIZATION

BACKGROUND OF THE INVENTION

The present invention relates to a novel method for suspension polymerization which is useful in providing a narrow, small particle size distribution. The method is useful in providing finely divided color developers for use in carbonless paper and cylithographic imaging systems of the type described in U.S. Pat. Nos. 4,399,209 and 4,772,541 in providing toners for electrophotography, and in providing moulding powders.

Methods for the suspension polymerization of acrylates and other unsaturated monomers are well known in the art. The process normally consists in dispensing a liquid monomer in an aqueous phase with stirring to form a dispersion of monomer droplets in the aqueous phase. The suspension is normally stablized by the presence of a dispersing agent, examples of which include gelatin, starch, methyl cellulose, polyvinyl alcohol, salts of polyacrylic and polymethacrylic acids and certain inorganic colloidal materials; e.g., hydrated magnesium silicates and tricalcium phosphate; nonionic surfactants, anionic surfactants and the like.

It is generally considered difficult and expensive to prepare particles in the 1 to 20 micron range. The material being polymerized passes through a sticky, viscous phase during which the particles tend to coalesce causing the formation of aggregates and a lack of uniformity as to particle size and molecular weight. Small amounts of suspension stabilizers or dispersing agents are used to prevent the particles from sticking together and agglomerating during the polymerization process. The lack of suitable stabilizers and dispersing agents is considered a major reason that small particles and a narrow particle size distribution have not been obtained.

SUMMARY OF THE INVENTION

In accordance with the present invention, polymeric particles having a small particle size (e.g., as small as 1 micron) and a narrow size distribution can be obtained by suspension polymerization by incorporating a polyisocyanate in the monomer composition and dispersing the monomer in an aqueous solution of a water soluble anionic polymer. While not desiring to be bound, it is believed that a thin polyurea shell forms around the monomer particles which prevents the particles from agglomerating and maintains a small particle size. While an analogous technique has been used in the preparation of microcapsules, to the best of applicants' knowledge the technique has not been used in suspension polymerization (e.g., see U.S. Pat. No. 4,353,809).

Accordingly, one embodiment of the invention is a method for suspension polymerization of a monomer which comprises preparing a mixture of a monomer or a combination of monomers, a free radical initiator, and a polyisocyanate or an adduct thereof; dispersing that mixture in an aqueous solution of a surfactant such as an anionic polymer, and effecting polymerization of the monomer.

In accordance with one manifestation of the invention, the aforesaid process is used in the preparation of a finely divided color developer for use in carbonless paper. In another manifestation of the invention it is used in preparing toner particles, molding powders and the like.

DETAILED DESCRIPTION OF THE INVENTION

The present invention is useful in the suspension polymerization of suspension polymerizable monomers, including ethylenically unsaturated monomers such as acrylic acid, acrylates (e.g., methyl, ethyl, butyl, isoamyl acrylates, etc.), methacrylates (e.g., methyl methacrylate, etc.), vinyl benzenes (e.g., styrene, divinyl benzene), acryonitrile maleic acid, dimethyl maleate, diethyl maleate, maleic anhydride, dimethyl fumarate, and mixtures thereof, vinyl chloride, vinylidene chloride, vinyl fluoride, vinylidene fluoride, vinyl acetate, butadiene, zinc methacrylate, zinc acrylate, magnesium acrylate and magnesium methacrylate.

In most embodiments of the invention a mixture of monomers will be used which provides a polymeric particle having the properties required or desired in a particular end use. For example, the monomer composition shown in Example 1 is useful as a toner in electrophotographic applications.

In some cases, it may be desirable or necessary to pretreat pigments to incorporate them in the polymeric particle. For example, some pigments such as $TiO_2$ may separate in the monomer and loose their hiding power. Other pigments such as carbon black may inhibit polymerization. Pre-treated pigments are commercially available which are useful here. These treatments render the surface of the pigment hydrophobic such that it can be dispersed in the polymer. In another embodiment of the invention, the pigments are pretreated with the polyisocyanate (e.g., by simply mixing pigment and polyisocyanate) and subsequently predispersed in monomer.

Charge controlling agents such as C.I. Acid Red 277 and C.I. Acid Black 63, lubricants or flow modifiers such as stearic acid, and sometimes magnetite such as Mapico Black, MO-4232 (Pfizer Pigment Co.) may also be included in the monomer mixture.

After polymerization, the resulting dispersion is introduced into an atomization and heating device to remove water and obtain the dried toner particles having diameters in the range of 5 to 15 microns depending on the reaction conditions and dispersing agents used.

The polymeric particles produced in accordance with the invention are also useful as a developer material in a cylithographic photographic product described in U.S. Pat. No. 4,772,541. Here, it is desirable to form a thermally fusible particle having a melt flow temperature of about 100° C. to 130° C. and a minimum film forming temperature of about 60°-80 C. as explained in U.S. Pat. No. 4,877,767. One such monomer mixture is shown in Example 2 herein.

The method of the present invention can be used to prepare particles as small as 1 micron and as large as particles prepared by conventional processes. For use as a developer, the particles preferably range from 0.5 to 10 microns, and more preferably from 2 to 5 microns. For use as a dry toner they preferably range from 3 to 15 microns, and more preferably from 5 to 12 microns. One of the important advantages of the invention is the ability to produce particles less than 12 microns in diameter.

In accordance with the invention a polyisocyanate is incorporated in and preferably dissolved in the monomer prior to suspension polymerization. The polyisocyanate is generally used in an amount of about 0.005 to 10 parts per 100 parts monomer, more preferably about 1 to 7 parts per 100 parts of monomer.

Useful polyisocyanates include aliphatic and aromatic diisocyanates, triisocyanates and tetraiisocyanates.

Representative examples of polyisocyanates include m-phenylenediisocyanate, p-phenylenediisocyanate, 2,6,tolylenediisocyanate, 2,4-tolylenediisocyanate (TDI), naphthalene-1,4-diisocyanate, diphenylmethane-4,4'-diisocyanate, 3,3'-dimethoxy-4,4'-biphenyldiisocyanate, 3,3'-dimethylphenylmethane-4,4'-diisocyanate, xylylene-1,4-diisocyanate, xylylene-1,3-diisocyanate, 4,4'-diphenylpropanediisocyanate, trimethylenediisocyanate, hexamethylenediisocyanate (HDI), biurets of HDI, propylene-1,2-diisocyanate, butylene-1,2-diisocyanate, ethylidinediisocyanate, cyclohexylene-1,2-diisocyanate, cyclohexylene-1,4-diisocyanate, p-phenylenediisothiocyanate, xylylene-1,4-diisothiocyanate, ethylidineiosthiocyanate and the like; triisocyanates such as 4,4',4"-triphenylmethane-triisocyanate, toluene-2,4,6-triisocyanate, polymethylenepolyphenyltriisocyanate and the like; tetraisocyanates such as 4,4'-dimethyldiphenylmethane-2,2',5,5'-tetraisocyanate and the like.

In accordance with one embodiment of the invention, the isocyanate is a functionalized adduct including an anionic or acid moiety. Examples of anionic moieties are $OSO_3-$, $OPO_3=$, $COO-$, $SO_2O-$, $S_2O_3-$, $POO-$, and $PO_3=$. Such functionalized isocyanates are generally prepared by reacting a compound having the anionic moiety and a pendant group such as hydroxy, amino or carboxylic group with a polyvalent isocyanate or isothiocyanate. One such compound is 4-sulfophthalic acid sodium salt. This compound can be reacted with a polyvalent isocyanate such as hexamethylenediisocyanate or the like to produce a compound having a plurality of reactive isocyanate groups and a sulfonato group. Other useful compounds are sulfonated polyvalent compounds having labile hydrogen atoms such as sulfonated dicarboxylic acids, sulfonated polyols, etc. One sulfonated polyvalent isocyanate is commercially available from Mobay Corp. under the tradename Desmodur DA.

Free radical initiators useful in the invention are characterized in that they are oil soluble and essentially insoluble in water. If the initiator is substantially water soluble, a latex is formed. Examples of initiators include benzoyl peroxide, lauroyl peroxide, and azo compounds such as azo diisobutyronitrile. The concentration of the initiator should be on the order of about 0.05 to 1 part and preferably about 0.1 to 0.3 part per 100 parts monomer. In some cases water phase polymerization inhibitors such as thiourea, sodium nitrite, sodium thiosulfate, sodium thiocyanate, a hydroquinone, water soluble nitroxides such as tetramethyl-1-piperidinyloxy (TEMPO) and 3-carboxy-2,2,5,5-tetramethyl-1-pyrrolidinyloxy (PROXY) radicals or their derivatives may be necessary to eliminate very fine particles produced by either aqueous phase or emulsion polymerization mechanism. These inhibitors are generally used in an amount up to 0.05 part per 100 parts water.

In some cases a chain transfer agent will be added to the monomer composition to control molecular weight. Chain transfer agents and their use in controlling molecular weight are well known in the art. A preferred chain transfer agent, as used in the examples herein, is n-dodecylmercaptan.

The surfactants previously used in suspension polymerization may be used in the present invention. Preferred surfactants are anionic polymers which include $COO-$ or $SO_3-$ or like groups. Examples of naturally occurring anionic polymers are gum arabic, pectin, and alginic acid. Examples of semi-synthetic anionic polymers are carboxymethyl cellulose, phthalated gelatin, sulfated starch, cellulose sulfate, and lignin sulfonic acid. Synthetic anionic polymers which can be used in this invention include maleic anhydride based copolymers such as isobutylene maleic anhydride copolymer (including those copolymers hydrolyzed), acrylic acid based homopolymers and copolymers (including methacrylic acid based homopolymers and copolymers), vinyl-benzenesulfonic acid based homopolymers and copolymers, and carboxy modified polyvinyl alcohols. Nonionic water soluble polymers such as polyvinylpyrrolidone and its copolymers, polyvinylalcohol and its copolymers, polyacrylamide and its copolymers, and hydroxyethylcellulose and its derivatives (such as hydrophobic HEC's) block copolymers of ethylene oxide and propylene oxide are also useful in this process.

In a preferred embodiment of the invention, the internal phase is dispersed in a solution of pectin and sulfonated polystyrene. Typical examples of sulfonated polystyrenes useful in the present invention are Versa TL500 and Versa TL502B, products of National Starch Co. Useful sulfonated polystyrenes are generally characterized by a sulfonation degree of over 85% and preferably over 95%. The molecular weight of the sulfonated polystyrene is preferably greater than 100,000 and more preferably about 500,000 but other molecular weights can also be used.

The anionic polymer is usually added to the aqueous phase in an amount of about 0.1 to 20% of the monomer and is preferably about 1 to 6%. In the preferred embodiment of the invention, pectin is added to the aqueous phase in an amount of about 0 to 5% by weight and the sulfonated polystyrene is usually added to the aqueous phase in an amount of about 1 to 6% by weight.

The monomer is dispersed in the aqueous phase under conditions which afford the desired particle size. While particles up to 500 microns can be produced by this method, the invention is particularly advantageous because it can yield particles on the order of 1 to 20 microns and more particularly 2 to 10 microns with a narrow size distribution.

The monomer will generally be dispersed in the aqueous phase in an amount of about 0 to 60 parts monomer per 100 parts aqueous phase.

Because the polymerization reaction is highly exothermic, for more volatile monomers, the reaction can be carried out under pressure, e.g., about 3 atm. To initiate the reaction, the suspension may be heated to 40° C. to 100° C.

The method of the present invention is particularly useful in preparing color developers for use in carbonless paper and cylithographic imaging systems of the type taught in U.S. Pat. No. 4,399,209. In this embodiment, the monomer composition is modified to include as developer material such as a metal salt of a salicylic acid and derivatives thereof. Preferred developers are oil soluble and exhibit low solubility in water. Examples of these developers are well known in the art and include zinc 3,5-di-t-butylsalicylate, zinc 3,5-di--methylbenzylsalicylate, zinc 2-hydroxynaphthoate, and others such as Developer Coreaktant C-540 supplied by Ciba-Geigy. The developer is generally incorporated in the monomer in an amount sufficient to provide the desired density such as about 30 to 100 parts per 100 parts monomer (Examples 3 and 5).

In accordance with another embodiment of the invention, microporous particles are prepared by incorporating a blowing agent or other volatile agent such as a volatile non-reactive solvent which can be removed from the formed particle by heating and thus open up pores in the particle. As a developer, this is advantageous as it increases the reactive surface area of the particle and thereby improves density. It may also be desirable in preparing plastic pigments for use in paper coatings or the like.

The invention is illustrated in more detail by the following non-limiting examples:

EXAMPLE 1

The following composition was prepared and dispersed in an aqueous solution containing 75 g water, 1.3 g Versa 502A, 0.7 g pectin, 0.2 g Aerosol OT, pH adjusted to 5.5 to 6.5 with sodium bicarbonate:

| | |
|---|---|
| Styrene | 21.70 g |
| Butyl Methacrylate | 13.30 g |
| Methacrylic Acid | 0.35 g |
| n-Dodecylmercaptan | 0.10 g |
| Desmodur DA | 1.05 g |
| Benzoyl Peroxide | 0.10 g |
| Dye or Submicron Pigment** | 3.50 g |

**For examples, C.I. Solvent Red 127, malachite green, C.I. Acid Red 94, C.I. Acid Blue 1, C.I. Acid Yellow 19, C.I. Acid Violet 49, carbone black, silica and $TiO_2$, etc.

The monomer phase is emulsified into the aqueous phase under high shear. Oxygen is excluded and the reactor is saturated with nitrogen. The reaction is carried out without reflux under autogeneous pressure at 70° C. to 90° C. for 3 to 4 hours. The heat of polymerization is controlled by external cooling. The particle size and distribution are dependent on the agitation conditions, type and concentration of stabilizers used. The dispersion thus obtained had a solid content of 35% and a particle size in the range of 2 to 15 microns. The resulting dispersion was then introduced into an atomizer and heating device to remove water and obtain dried toner particles ready for use in electrophotographic reproduction or in other graphic art applications such as color proofing.

EXAMPLE 2

The following composition was prepared and processed as in Example 1:

| | |
|---|---|
| Styrene | 14.12 g |
| Acrylonitrile | 6.91 g |
| Methyl Methacrylate | 7.96 g |
| Butyl Acrylate | 4.37 g |
| Divinylbenzene | 0.084 g |
| Methacrylic Acid | 0.35 g |
| n-Dodecylmercaptan | 0.10 g |
| Desmodur N-100 | 1.05 g |
| Benzoyl Peroxide | 0.10 g |

After polymerization, the dispersion obtained in Example 2 was blended with zinc salicylate dispersions and a suitable binder as follows to obtain a developer composition:

| | Dry Weight |
|---|---|
| Dispersion from Example 2 | 65–75 |
| Zinc Salicylate Dispersion | 25–35 |
| Polyvinyl Alcohol | 2–4 |
| Surfactant | 1–2 |

The dispersion obtained in Example 2 can also be blended with a novalac emulsion such as HRJ-4542 from Schenectady Chemical Co. to obtain a developer composition.

This composition was coated on a sheet of paper to provide a developer sheet.

EXAMPLE 3

The composition from Example 1 was dispersed in a solution of 75 g water, 1.1 g of a copolymer of sodium styrene sulfonate and methoxy (polyethylene oxide) methacrylate, 0.65 g Versa 502A, pH adjusted to 5.5 to 6.5.

EXAMPLE 4

Example 3 was repeated except the monomer composition in Example 2 was used.

EXAMPLE 5

Example 1 was repeated using the following composition:

| | |
|---|---|
| Methyl Methacrylate | 19.60 g |
| Butyl Acrylate | 4.32 g |
| Methacrylic Acid | 0.35 g |
| Zinc Bis(3,5-di-tert-butyl salicylate) | 10.00 g |
| n-Dodecylmercaptan | 0.07 g |
| Desmodur DA | 1.05 g |
| Benzoyl Peroxide | 0.10 g |

The dispersion obtained from this Example 5 was blended with a suitable binder such as polyvinyl alcohol and coated on a sheet of paper Or transparent substrate such as PET to provide a developer sheet.

EXAMPLE 6

Example 1 was repeated using the following composition:

| | |
|---|---|
| Methyl Methacrylate | 19.60 g |
| Butyl Acrylate | 4.32 g |
| Methacrylic Acid | 0.35 g |
| Divinyl Benzene | 0.02 g |
| Octane | 1.75 g |
| Zinc Bis(3,5-di-tert-butyl salicylate) | 10.00 g |
| Trimethylol Propane | 0.30 g |
| Desmodur DA | 1.05 g |
| Lauroyl Peroxide | 0.10 g |

The octane present in the particles evaporated and expanded the particles when the coating was subjected to high temperature (170° F. to 250° F.) drying. The microporosity of these expanded particles increases the efficiency of dye transfer and in turn increases the image density.

EXAMPLE 7

Example 6 was repeated using the following composition:

| | |
|---|---|
| Methyl Methacrylate | 16.45 g |
| Butyl Acrylate | 6.30 g |
| Acrylonitrile | 12.25 g |
| Methacrylic Acid | 0.35 g |
| Divinyl Benzene | 0.035 g |
| Octane | 1.75 g |
| Desmodur DA | 1.05 g |
| Triethanol Amine | 0.30 g |
| Lauroyl Peroxide | 0.10 g |

The expandable particles in Example 7 are useful as plastic pigments for coating applications, particularly paper coatings. Alternatively, they can be obtained in a dry powder form by drying in an atomization device, and are useful as expandable molding powder in insulation and packaging applications.

Having described the invention in detail and by reference to preferred embodiments thereof, it will be apparent that modifications and variations are possible without departing from the scope of the invention defined in the appended claims.

What is claimed is:

1. A method for polymerizing a monomer suspended in water which comprises:
   preparing a polymerization mixture of a water immiscible, liquid, ethylenically unsaturated monomer, a polyisocyanate and an oil soluble free radical initiator, dispersing said mixture in a solution of water and a surfactant, and effecting polymerization of said monomer.

2. The method of claim 1 wherein said surfactant is an anionic polymer.

3. The method of claim 2 wherein said monomer is an acrylate or a methacrylate.

4. The method of claim 3 wherein said polyisocyanate is selected from the group consisting of aliphatic and aromatic polyisocyanates.

5. The method of claim 4 wherein said anionic polymer is a homopolymer or copolymer of sulfonated vinyl benzene.

6. The method of claim 2 wherein said anionic polymer is a combination of pectin and sulfonated polystyrene.

7. The method of claim 2 wherein said polyisocyanate is a biuret of hexamethylene diisocyanate.

8. The method of claim 1 wherein said polyisocyanate is a sulfonated polyisocyanate.

9. The method of claim 1 wherein said method is performed under agitation conditions which yield polymeric particles having an average particle size of 1 to 20 microns.

10. The method of claim 1 wherein an oil soluble developer is added to said mixture.

11. The method of claim 10 wherein said monomer is a mixture of monomers which provides a melt flow temperature in the range of 100° C. to 130° C.

12. The method of claim 1 wherein said method yields polymeric particles having a particle size less than 15 microns.

13. The method of claim 1 wherein said polymerization mixture additionally includes a blowing agent and said method includes the additional step of activating said blowing agent such that a microporous polymeric particle is achieved.

14. The method of claim 13 wherein said blowing agent is a volatile solvent.

15. The method of claim 1 wherein said polymerization mixture includes a chain transfer agent.

16. A polymeric particle prepared by the method of claim 1.

17. The polymeric particle produced by the method of claim 16, said particle having the property that it is useful as a developer in a cylithographic material.

* * * * *